United States Patent
Jan et al.

(10) Patent No.: US 7,988,379 B2
(45) Date of Patent: Aug. 2, 2011

(54) JOINT MECHANISM

(75) Inventors: Te-Sheng Jan, Taipei Hsien (TW);
Yu-Tao Chen, Taipei Hsien (TW);
Chun-Che Yen, Taipei Hsien (TW);
Meng-Hua He, Shenzhen (CN);
Jian-Jun Li, Shenzhen (CN);
Zheng-Qiang Song, Shenzhen (CN);
Gang Cheng, Shenzhen (CN);
Bing-Jing Xu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 392 days.

(21) Appl. No.: 12/099,746

(22) Filed: Apr. 8, 2008

(65) Prior Publication Data
US 2009/0097909 A1    Apr. 16, 2009

(30) Foreign Application Priority Data
Oct. 12, 2007   (CN) .......................... 2007 1 0202034

(51) Int. Cl.
*F16C 11/06* (2006.01)
(52) U.S. Cl. ........ 403/141; 403/114; 403/131; 403/135; 403/142; 403/143
(58) Field of Classification Search .................. 403/113, 403/114, 122, 128, 130, 131, 135, 141, 142, 403/143
See application file for complete search history.

(56) References Cited

U.S. PATENT DOCUMENTS

| | | | | |
|---|---|---|---|---|
| 1,455,441 A | * | 5/1923 | La Hodny | 403/141 |
| 3,409,315 A | * | 11/1968 | Wichers et al. | 285/153.3 |
| 3,430,995 A | * | 3/1969 | Herbenar et al. | 403/126 |
| 4,332,500 A | * | 6/1982 | Smith et al. | 403/114 |
| 6,099,192 A | * | 8/2000 | Free | 403/114 |
| 6,164,861 A | * | 12/2000 | Maughan | 403/135 |
| 6,190,080 B1 | * | 2/2001 | Lee | 403/135 |
| 6,298,556 B1 | * | 10/2001 | Stall et al. | 464/111 |
| 6,505,990 B1 | * | 1/2003 | Maughan | 403/135 |
| 6,761,499 B2 | * | 7/2004 | Bohne et al. | 403/141 |
| 7,226,234 B2 | * | 6/2007 | Gordy et al. | 403/141 |
| 7,520,691 B2 | * | 4/2009 | Dearing et al. | 403/135 |

FOREIGN PATENT DOCUMENTS
CN      2503259 Y    7/2002
CN    101018971 A    8/2007

* cited by examiner

*Primary Examiner* — Michael P Ferguson
(74) *Attorney, Agent, or Firm* — Frank R. Niranjan

(57) ABSTRACT

An exemplary joint mechanism (100) includes a pivot shaft (10), a joint (20), a rotary arm (30), and two bearings (50). The pivot shaft (10) is non-rotatable relative to the joint (20). The joint (20) is received in the rotary arm (30). The rotary arm (30) is rotatable relative to the joint (20). The two bearings (50) are fixed to an inner surface of the rotary arm (30). Each bearing (50) includes a concave inner surface, and the concave inner surface is engaged with a curved outer surface of the joint (20).

10 Claims, 4 Drawing Sheets

JOINT MECHANISM

BACKGROUND OF THE INVENTION

1. Field of the Invention

The present invention generally relates to joint mechanisms, and more particularly, to a joint mechanism for rotatably connecting members.

2. Discussion of the Related Art

In some devices, components, such as pivot shafts, pins, and joint bearings, are usually provided to rotatably connect two members of the devices. For example, a device includes an actuating portion, a supporting portion, and a joint mechanism for connecting the actuating portion and the supporting portion. A typical joint mechanism includes a base fixed to the supporting portion and a movable member fixed to the actuating portion. The movable member includes a spherical portion. The spherical portion is rotatably received in a hole of the base. Thus, the movable member together with the actuating portion can be rotated relative to the base and the supporting portion.

Due to friction, wear and tear occurs between the spherical portion of the movable member and the base, thus the service life of the joint mechanism is shortened. Generally, in order to reduce friction, lubricant is continuously applied between the spherical portion of the movable member and the base. This constant maintenance the joint mechanism is inconvenient. In addition, the lubricant and the wear and tear may make the movable member unable to keep a desired fixed position relative to the base.

Therefore, a new joint mechanism that is superior in inhibiting wear and tear is desired.

SUMMARY

An exemplary joint mechanism includes a pivot shaft, a joint, a rotary arm, and two bearings. The pivot shaft is non-rotatable relative to the joint. The joint is received in the rotary arm. The rotary arm is rotatable relative to the joint. The two bearings are fixed to an inner surface of the rotary arm. Each bearing includes a concave inner surface, and the concave inner surface is engaged with a curved outer surface of the joint.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present joint mechanism. Moreover, in the drawings, like reference numerals designate corresponding parts throughout the several views, and all the views are schematic.

DETAILED DESCRIPTION OF THE EMBODIMENTS

Reference will now be made to the drawings to describe preferred embodiments of the present joint mechanism in detail.

Figure 1:
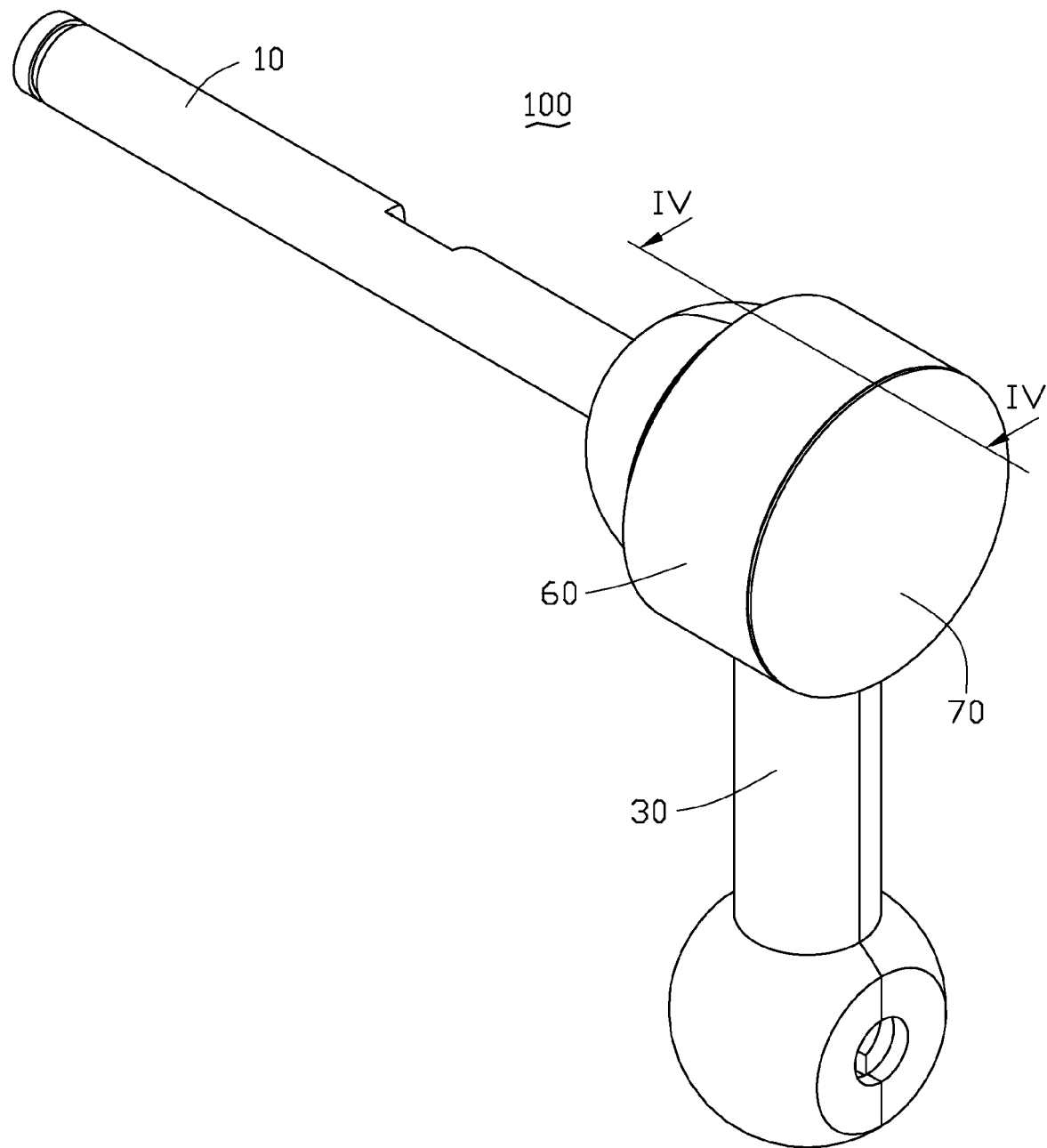
FIG. 1 is an assembled view of a joint mechanism in accordance with a preferred embodiment of the present invention.
Figure 2:
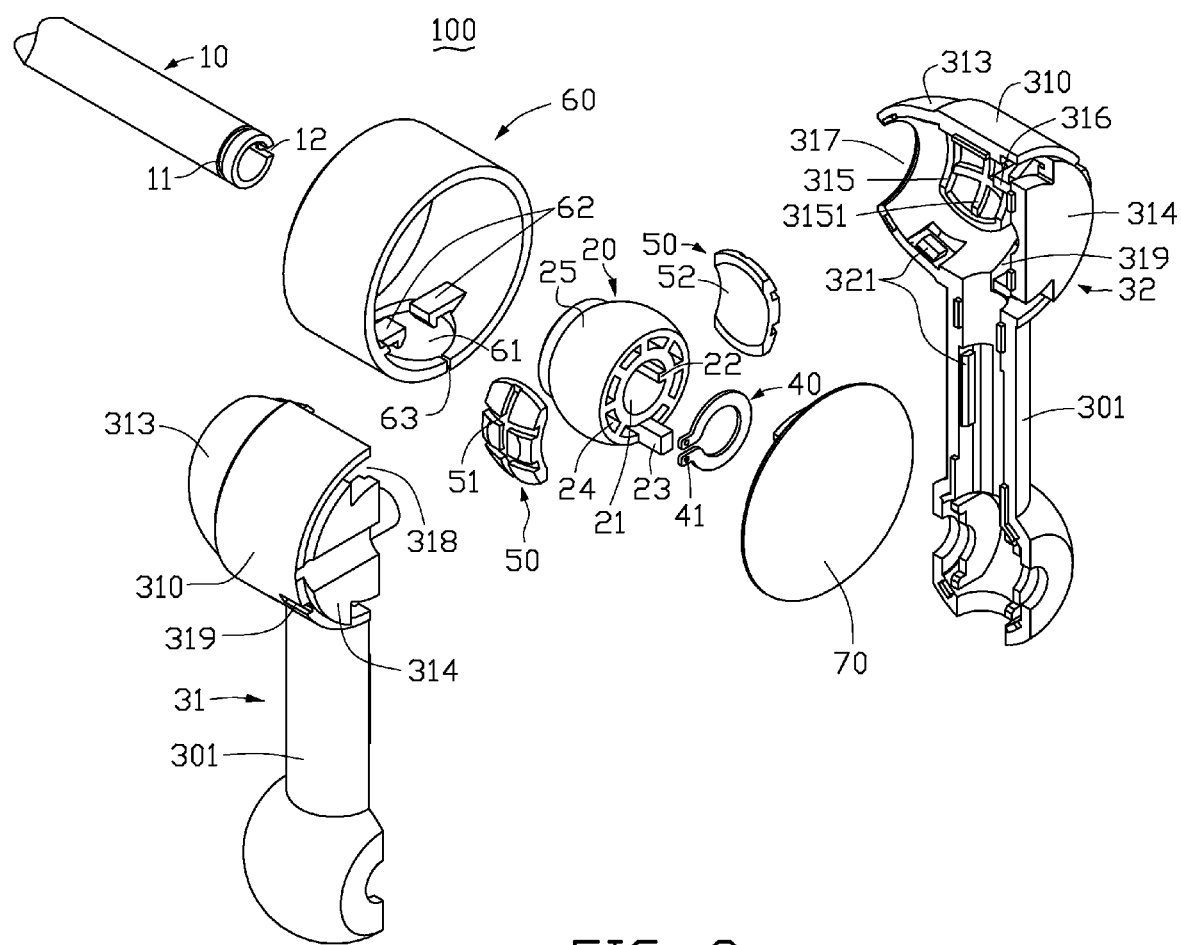
FIG. 2 is an exploded, isometric view of the joint mechanism shown in FIG. 1.
Figure 3:
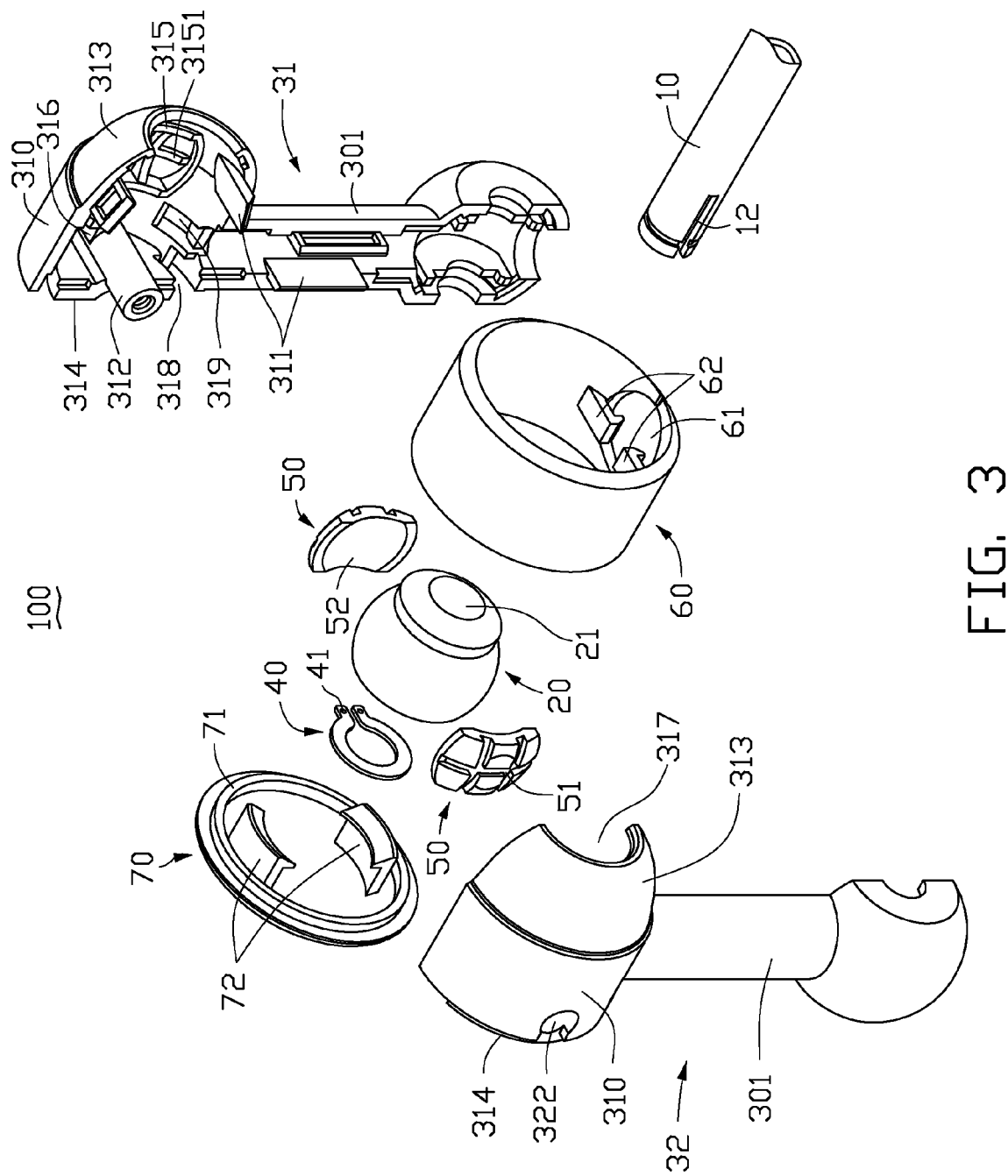
FIG. 3 is similar to FIG. 2, but viewed from another aspect.

Referring to FIGS. 1 through 3, a joint mechanism 100 in accordance with a preferred embodiment is shown. Some devices, such as toys and electric appliances, usually have an actuating portion and a supporting portion rotatably connected to each other. The joint mechanism 100 is provided to rotatably attach the actuating portion to the supporting portion. The joint mechanism 100 includes a pivot shaft 10, a pivot ball 20, a rotary arm 30, a clip ring 40, two bearings 50, a sleeve 60, and a cover 70.

The pivot shaft 10 is substantially a hollow rod. A peripheral groove 11 and a latching groove 12 are defined in the pivot shaft 10. The peripheral groove 11 encircles a cylindrical surface of the pivot shaft 10 adjacent to a first end of the pivot shaft 10. The peripheral groove 11 is configured for engaging with the clip ring 40. The latching groove 12 is defined in the first end of the pivot shaft 10 and intersects with the peripheral groove 11. The latching groove 12 extends parallel to a cylindrical axis of the pivot shaft 10. The other end (not labeled) of the pivot shaft 10 opposite to the peripheral groove 11 is configured for fixing to the supporting portion of the device.

The pivot ball 20 is substantially a hollow spheroid. The pivot ball 20 defines a shaft hole 21 running through a middle portion of the pivot ball 20. A latching portion 22 is formed on an inner sidewall (not labeled), of the pivot ball 20, defining the shaft hole 21, and a limiting block 23 is formed on one end of the pivot ball 20. The latching portion 22 is configured for engaging in the latching groove 12 of the pivot shaft 10. In this way, the pivot ball 20 is non-rotatable relative to the pivot shaft 10. To reduce a weight of the pivot ball 20, the pivot ball 20 defines a plurality of holes 24 between the inner sidewall and a spherical outer surface 25 of the pivot ball 20. Alternatively, the holes 24 may be omitted. The outer surface 25 may be any other kinds of curved surfaces.

In alternative embodiments, the pivot ball 20 may include more than one latching portions 22. In such cases, there may be more than one latching grooves 12 in the pivot shaft 10 accordingly.

The rotary arm 30 includes a first unit 31 and a second unit 32 that cooperatively form the rotary arm 30. Each of the first and second units 31, 32 includes a main body 310 and an extending portion 301. Each main body 310 has a spherical surface 313 and a flat surface 314 opposite to the spherical surface 313. The main body 310 of the first unit 31 forms a cylindrical receptacle 312 perpendicularly from an inner surface of the main body 310. The cylindrical receptacle 312 is substantially a cylinder with a threaded hole (not labeled) defined therein. The second unit 32 defines a circular hole 322 therein. A fastening member (not shown) having a threaded portion is inserted into the circular hole 322 of the second unit 32 and engaged in the threaded hole of the cylindrical receptacle 312, thereby the second unit 32 is tightly connected to the first unit 31. The main bodies 310 of the units 31, 32 each includes a bearing holder 315 having a plurality of fixing ribs 3151 extending from an the inner surface thereof, a stopper portion 316 formed in an inner surface thereof and a latching groove 319 defined in an inner surface thereof. The stopper portions 316 are configured to restrict movements of the limiting block 23 of the pivot ball 20. Therefore, a rotating range of the rotary arm 30 relative to the pivot ball 20 is restricted. When the rotary arm 30 is assembled, a restricting hole 317 is defined in the spherical surface 313 of the rotary arm 30, and two receiving grooves 318 are defined in opposite sides of the flat surface 314 of the rotary arm 30. The rotary arm 30 is rotatably attached to the actuating portion of the device that the joint mechanism 100 employed in.

The clip ring 40 is substantially a C-shaped clip. A pin hole 41 is defined in each end of the clip ring 40 so that the clip ring 40 is easily assembled by inserting pins into the pin holes 41. The clip ring 40 is engaged in the peripheral groove 11 of the pivot shaft 10 after the pivot shaft 10 protrudes through the pivot ball 20, thereby preventing the pivot shaft 10 from being detached from the rotary arm 20.

In alternative embodiment, the pivot shaft 10 may be fixed to the pivot ball 20 by welding or adhesive substances. The pivot shaft 10 can also be integrally made with the pivot ball 20. In such cases, the latching groove 12 of the pivot shaft 10, the latching portion 22 of the pivot ball 20 and the clip ring 40 can be omitted.

The bearings 50 are made of plastic materials with high-wearing feature. Each of the bearings 50 includes a smooth, concave inner surface 52. Each concave inner surface 52 is substantially a spherical surface. The concave inner surfaces 52 of the bearings 50 are oriented symmetrically opposite to each other for engaging with the spherical outer surface 25 of the pivot ball 20. A plurality of concave portions 51 are defined in an outer surface of each of the bearings 50 for engaging with the fixing ribs 3151 of the bearing holder 315 correspondingly. The bearings 50 can be fixed to the first unit 31 and the second unit 32 by inserting the bearings 50 into the bearing holder 315. Alternatively, the joint mechanism 100 may include one or more than two bearings 50. In such cases, there may be one or more than two the bearing holders 315 corresponding to an amount of the bearings 50. Alternatively, the concave inner surface 52 of each bearing 50 is not limited to be a spherical surface, it can be any other kinds of concave curved surfaces, corresponding to the curved outer surface 25 of the pivot ball 20.

In an alternative embodiment, the bearings 50 may be fixed to the first unit 31 and the second unit 32 correspondingly by welding or adhesive substances. It can be understood that, the bearings 50 can also be made integrally with the first unit 31 and the second unit 32 correspondingly.

The sleeve 60 is substantially a hollow cylinder with two openings at two ends thereof. A through hole 61 is defined through a cylindrical surface of the sleeve 60, furthermore a slit 63 is defined communicating between the through hole 61 and an opening of the sleeve 60. An inner surface of the sleeve 60 forms two latching portions 62 on opposite sides of the through hole 61. The latching portions 62 are configured for engaging in the latching groove 319 of the rotary arm 30. A radius of the through hole 61 is the same as or a little larger than that of the extending portion 301 so as to allow the extending portion 301 being inserted through the through hole 61. When an external force is applied to the slit 63, the rotary arm 30 can be inserted into the through hole 61 and the main bodies 310 of the rotary arm 30 are received in the sleeve 60.

The cover 70 is substantially a circular sheet. The cover 70 includes a rim 71 around a middle portion of the cover 70 and two latching portions 72. The two latching portions 72 are disposed symmetrically to each other relative to a cylindrical axis of the cover 70, and are configured for engaging in the receiving grooves 318 of the rotary arm 30.

Figure 4:
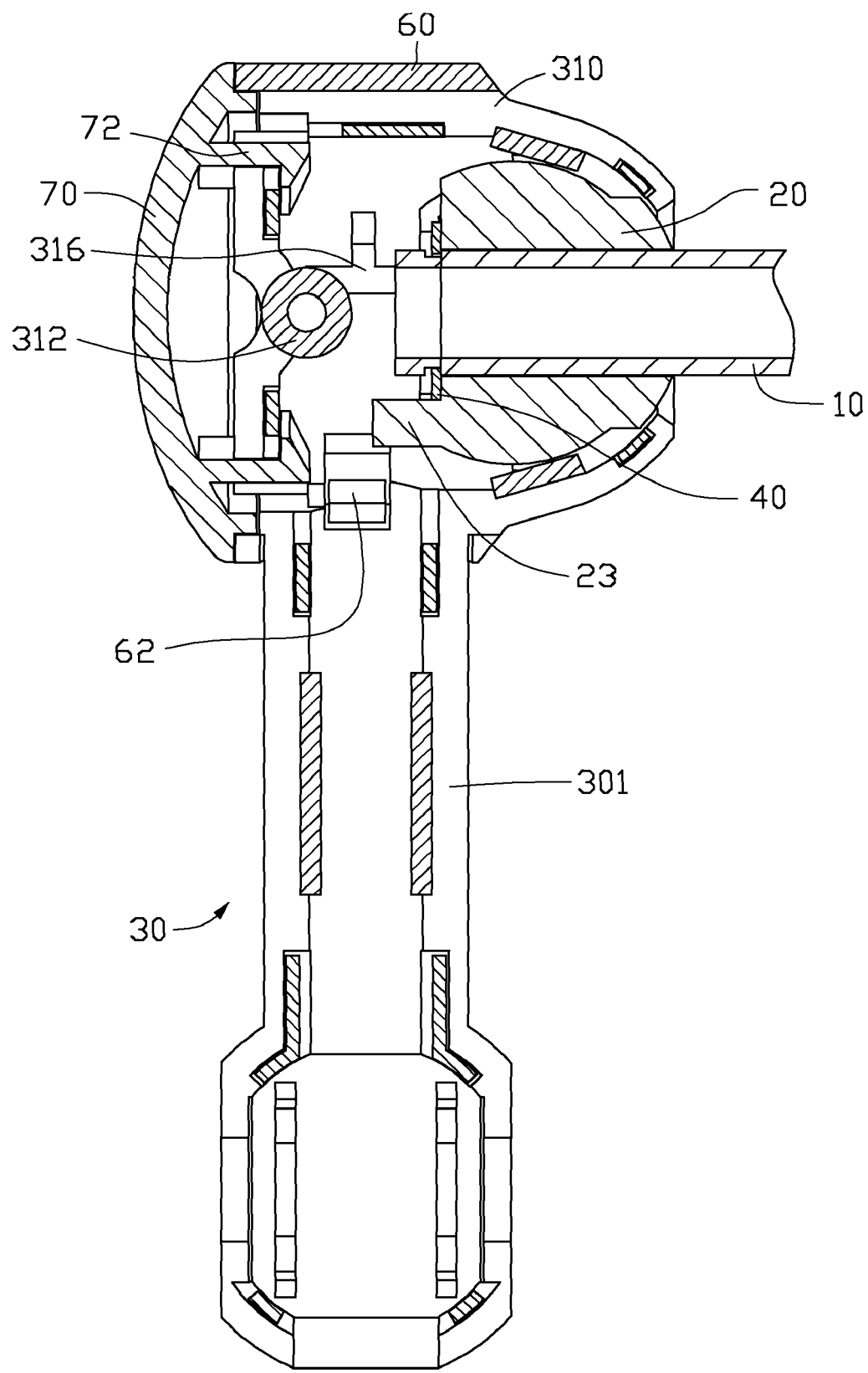
FIG. 4 is an enlarged, cross-sectional view of the joint mechanism shown in FIG. 1, taken along line IV-IV thereof.

Referring to FIGS. 2 through 4, in assembly, with the latching groove 12 engaging with the latching portion 22 of the pivot ball 20, the pivot shaft 10 is partially inserted into the shaft hole 21 of the pivot ball 20. The clip ring 40 is engaged with the peripheral groove 11 of the pivot shaft 10. The bearings 50 are fixed to the first unit 31 and the second unit 32 correspondingly. The pivot ball 20 is positioned between the first unit 31 and the second unit 32. A fastening member having a threaded portion is inserted into the circular hole 322 of the second unit 32 and engaged in the threaded hole of the cylindrical receptacle 312. Thereby, the first unit 31 is attached to the second unit 32. The concave inner surfaces 52 of the bearings 50 are engaged with the spherical outer surface 25 of the rotary arm 20. An external force is applied to the slit 63 of the sleeve 60, and then the extending portion 301 is inserted into the hole 61 of the sleeve 60. The latching portions 62 are engaged in the latching groove 319 of the rotary arm 30. The cover 70 is engaged with the main body 310 of the rotary arm 30 by inserting the latching portions 72 into the receiving grooves 318 of the rotary arm 30. Then, the joint mechanism 100 is assembled.

To use the joint mechanism 100, the pivot shaft 10 is fixed relative to the pivot ball 20, and the pivot ball 20 is rotatable relative to the rotary arm 30. When an external force is applied to the rotary arm 30, the rotary arm 30 rotates around the pivot ball 20. A friction force is generated between the concave inner surfaces 52 of the bearings 50 and the pivot ball 20. Thus, the rotary arm 30 is able to be retained in any position relative to the pivot ball 20.

When the pivot shaft 10 is fixed to a supporting portion of the device, and the rotary arm 30 is rotatably attached to an actuating portion of the device. The actuating portion of the device can be rotated relative to the pivot shaft 10 and the pivot ball 20. The device can maintain any rotated position because of the friction produced by the bearings 50 and the pivot ball 20.

It can be understood that, the pivot shaft 10 can also be integrally made with the supporting portion of the device, and the rotary arm 30 can also be integrally made with the actuating portion of the device. The joint mechanism 100 is not limited to use for devices described-above, it can also be used for connecting an actuating portion and a supporting portion of other similar devices.

It can be understood that, the range of rotation of the rotary arm 30 relative to the pivot ball 20 is not only determined by a position of the stopper portions 316 of the rotary arm 30, but also determined by the size of the restricting hole 317 of the rotary arm 30. If the size of the restricting hole 317 is relative large, the rotary arm 30 is able to be rotated in a relatively large range. Otherwise, if the size of the restricting hole 317 is relatively small, the rotary arm 30 is able to be rotated in a relatively small range.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A joint mechanism comprising:
   a pivot ball having a curved outer surface;
   a pivot shaft being non-rotatable relative to the pivot ball;
   a rotary arm comprising:
     a spherical housing defining a cavity for rotatably receiving the pivot ball;
     a restricting hole defined in the spherical housing at an open end of the cavity to receive the pivot shaft, wherein the restricting hole has a radius to allow an angular movement of the pivot shaft and limit this angular movement when the pivot shaft comes into contact with an edge of the restricting hole;
   at least one bearing holder defined within an inner surface of the housing cavity and comprising a plurality of fixing ribs extending from the inner surface;
   an extension arm extending from the spherical housing;

two latching grooves defined in an outer surface of the spherical housing adjacent the extension arm; and at least one bearing being fixed within the housing cavity, the at least one bearing including a concave inner surface, the concave inner surface engaging with the curved outer surface of the pivot ball, the at least one bearing defining a plurality of concave portions for engaging with the fixing ribs of the at least one bearing holder of the rotary arm; and a sleeve being substantially a flexible and hollow cylinder with two openings at opposite ends thereof, wherein the sleeve comprises a through hole passing through a cylindrical surface of the sleeve, two latching portions formed on opposite sides of the through hole, and a slit communicating the through hole and one of the openings of the sleeve, when an external force is applied to the slit, the extension arm is insertable into the through hole of the sleeve, and the two latching portions being engaged in the corresponding latching grooves of the spherical housing;

wherein the pivot ball comprises a limiting block protruding out from an end of the pivot ball, the spherical housing comprises two stopper portions formed in the inner surface of the housing cavity, and a range of rotation of the rotary arm relative to the pivot ball is determined when the limiting block comes into contact with the stopper portions.

2. The joint mechanism as claimed in claim 1, wherein the pivot ball includes a shaft hole defined through a middle portion thereof, and a plurality of holes are defined between an inner surface of the shaft hole and an outer surface of the pivot ball.

3. The joint mechanism as claimed in claim 2, wherein the pivot shaft includes a latching groove, a latching portion is formed on an inner surface of the shaft hole, and the latching portion of the pivot ball engages in the latching groove of the pivot shaft.

4. The joint mechanism as claimed in claim 1, wherein the joint mechanism further comprises a clip ring, the pivot shaft includes a peripheral groove encircling an end thereof, and the peripheral groove is configured for engaging with the clip ring.

5. The joint mechanism as claimed in claim 1, wherein the rotary arm includes a first unit and a second unit that cooperatively form the rotary arm, and each of the first unit and the second unit includes a portion of the spherical housing and the extension arm.

6. The joint mechanism as claimed in claim 5, wherein the spherical housing portion of the first unit comprises a cylindrical receptacle extending perpendicularly form an inner surface of the spherical housing portion, the cylindrical receptacle is substantially a cylinder with a threaded hole defined therein, the second unit includes a circular hole defined therein, and a fastening member is inserted into the circular hole of the second unit and engaged in the threaded hole of the cylindrical receptacle so that the second unit is tightly connected to the first unit.

7. The joint mechanism as claimed in claim 5, wherein the at least one bearing is two bearings, each bearing includes a concave inner surface, the concave inner surface is substantially spherical surface, and the concave inner surfaces of the two bearings are oriented symmetrically opposite to each other for engaging with the curved outer surface of the pivot ball.

8. The joint mechanism as claimed in claim 7, wherein the spherical housing portions of the first unit and the second unit both includes a bearing holder having a plurality of fixing ribs extending from an inner surface thereof, and the two bearing holders are configured for engaging with the two bearings.

9. The joint mechanism as claimed in claim 1, further comprising a cover engaged with the spherical housing at an end opposite the restricting hole.

10. A joint mechanism comprising:
a pivot ball having a curved outer surface;
a pivot shaft being non-rotatable relative to the pivot ball;
a rotary arm comprising:
a spherical housing defining a cavity for rotatably receiving the pivot ball;
a restricting hole defined in the spherical housing at an open end of the cavity to receive the pivot shaft, wherein the restricting hole has a radius to allow an angular movement of the pivot shaft and limit this angular movement when the pivot shaft comes into contact with an edge of the restricting hole;
an extension arm extending from the spherical housing;
two latching grooves defined in an outer surface of the spherical housing adjacent the extension arm; and
at least one bearing being fixed within the housing cavity, the at least one bearing including a concave inner surface, the concave inner surface engaging with the curved outer surface of the pivot ball;
wherein the rotary arm includes a first unit and a second unit that cooperatively form the rotary arm, and each of the first unit and the second unit includes a portion of the spherical housing and the extension arm; and
a sleeve being substantially a flexible and hollow cylinder with two openings at opposite ends thereof, wherein the sleeve comprises a through hole passing through a cylindrical surface of the sleeve, two latching portions formed on opposite sides of the through hole, and a slit communicating the through hole and one of the openings of the sleeve, when an external force is applied to the slit, the extension arm is insertable into the through hole of the sleeve, and the two latching portions being engaged in the corresponding latching grooves of the spherical housing.

* * * * *